United States Patent

[11] 3,565,101

[72] Inventors Wilfred Aslan
Mahwah, N.J.;
Martin Greenwood, West New York, N.Y.
[21] Appl. No. 840,003
[22] Filed July 8, 1969
[45] Patented Feb. 23, 1971
[73] Assignee Alkon Products Corporation
Wayne, N.J.

[54] PNEUMATIC AMPLIFIER VALVE
13 Claims, 8 Drawing Figs.
[52] U.S. Cl. .................................................. 137/270,
137/625.6, 137/625.63, 137/505.39
[51] Int. Cl. ...................................................... F16k 11/07
[50] Field of Search .......................................... 137/270,
505.39, 505.41, 516.15, 625.6, 625.62, 625.63,
625.64

[56] References Cited
UNITED STATES PATENTS
| | | | |
|---|---|---|---|
| 2,966,168 | 12/1960 | Hunt et al. ..................... | 137/270 |
| 3,133,556 | 5/1964 | Caparone et al. .............. | 137/505.39 |
| 3,234,957 | 2/1966 | Allen............................. | 137/625.63X |

*Primary Examiner*—Henry T. Klinksiek
*Attorney*—Pennie, Edmonds, Morton, Taylor & Adams ABSTRACT: An actuator for a fluid valve assembly having a passageway connected to the inlet of the valve assembly, a constant pressure regulator and flow restriction means disposed in the passageway, and selectively operable signal means for connecting the outlet of the passageway to the movable control for operating the valve.

PATENTED FEB 23 1971
3,565,101
SHEET 1 OF 5
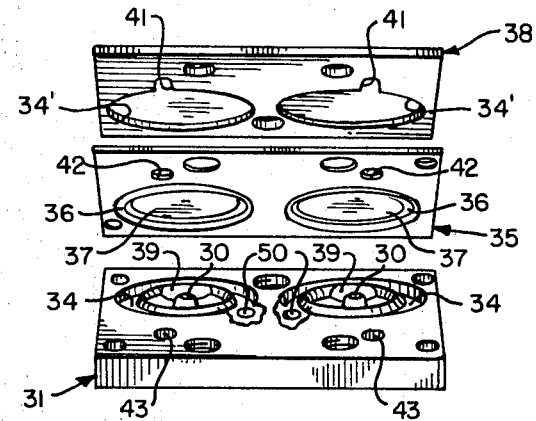
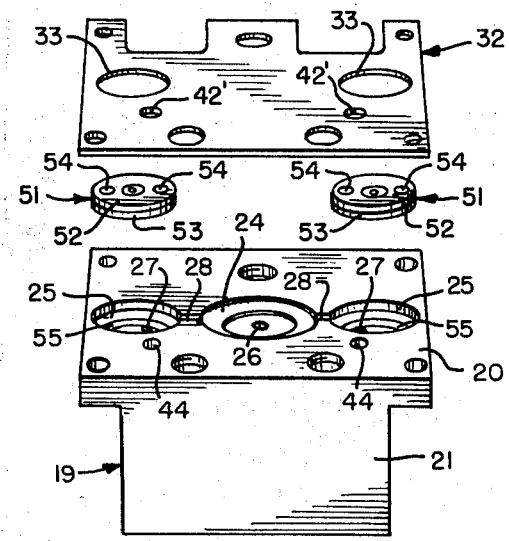
FIG. 1
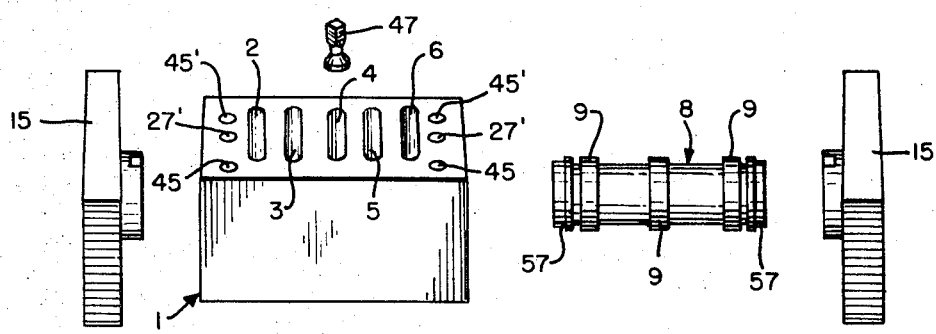
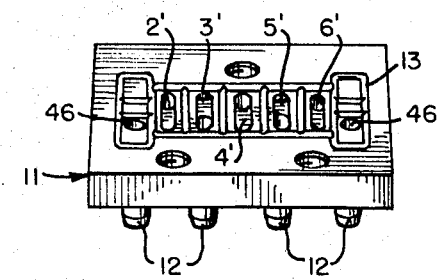
INVENTORS
WILFRED ASLAN
MARTIN GREENWOOD
BY
ATTORNEYS

INVENTORS
WILFRED ASLAN
MARTIN GREENWOOD

BY
ATTORNEYS

INVENTORS
WILFRED ASLAN
MARTIN GREENWOOD

ATTORNEYS

INVENTORS
WILFRED ASLAN
MARTIN GREENWOOD

ATTORNEYS

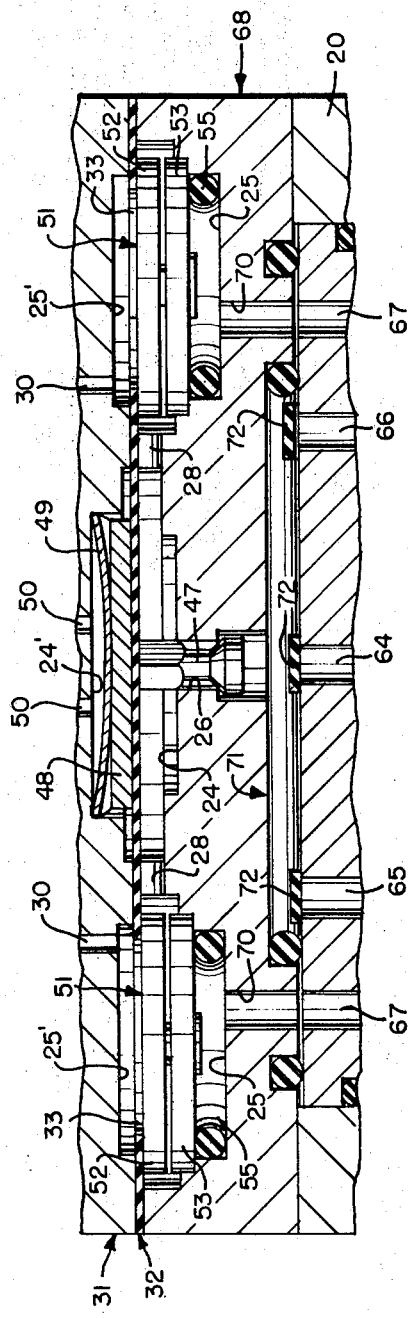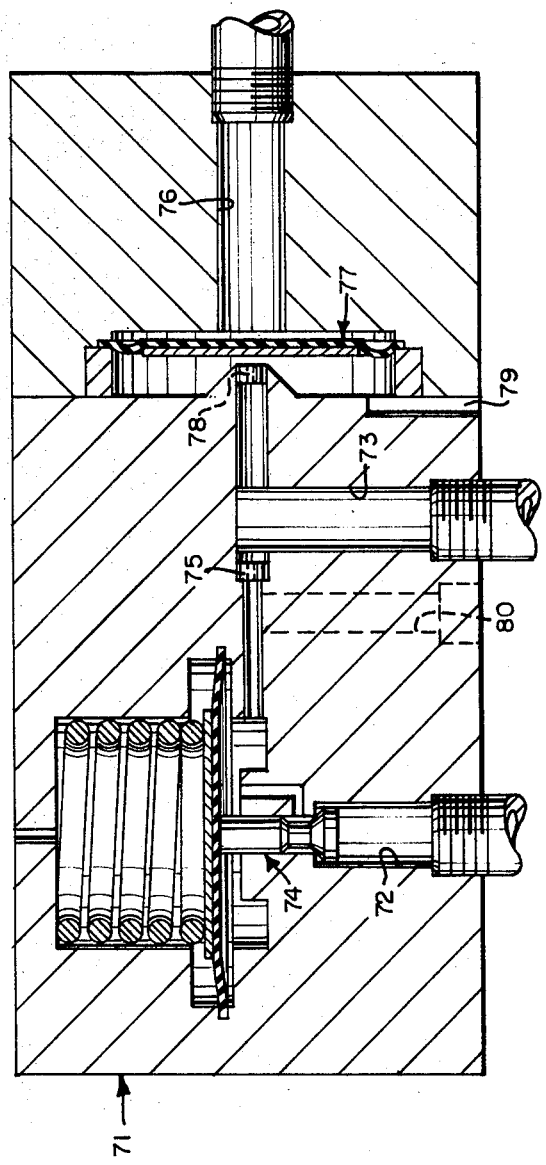

PNEUMATIC AMPLIFIER VALVE

BACKGROUND OF THE INVENTION

The present invention relates to an improved actuator for pilot operated valves. In the conventional construction of pilot operated valves, the valve assembly includes a body member having a series of valving ports connected to an interior bore. A spool control member is slidably mounted within the bore for movement between a plurality of operative valving positions; and the valve spool and valve body have cooperating valving surfaces for sealing off certain ports from certain other ports in the various operative valving positions of the spool. The valve body is typically mounted on a valve base having inlet and outlet ports connected to the inlet and outlet ports of the valve body. The inlet port or ports of the valve base are adapted to be connected to a source of fluid pressure while the outlet ports of the valve base are adapted to be connected to the device to which fluid pressure is to be supplied in response to operation of the valve assembly.

In operating a valve assembly of the type described above, actuating members may be provided at one or both ends of the valve body in alignment with the valve spool control member to cause axial shifting of the latter between the various valving positions. For example, a solenoid operated plunger member may be connected to one end of the valve body for shifting the valve spool in one direction and a spring or another solenoid plunger may be provided at the other end of the spool for shifting it in the opposite direction.

Alternatively, the shifting of the spool within the valve body may be effected by fluid pressure exerted on the opposite ends of the spool control member. In conventional constructions, this fluid pressure may be supplied to the valve assembly from the pressure source to which the assembly is connected. Suitable conduits may be provided to direct this pressure to the ends of the spool member.

In each of the constructions described above, the pressure which must be applied against the ends of the spool control member to cause shifting thereof may run in the order of several pounds per square inch. Accordingly, these valve assemblies are provided with a signal actuating pressure of like magnitude. Where this signal pressure is supplied by mechanical means such as, for example, a solenoid actuated plunger, the operating characteristics of the valve will be substantially uniform since the mechanical actuating mechanism may be accurately calibrated and controlled in response to a definite signal. Where, however, the signal pressure to the valve assembly is supplied as a fluid pressure as, for example, the inlet pressure to the assembly, the accuracy of the operation of the valve assembly may be affected. For example, the inlet pressure being supplied to the valve assembly may vary under normal operating conditions. With a varying signal pressure, the length of time it takes to create the necessary actuating pressure at the end of the spool will vary. Thus, the response of the valve assembly may vary under normal operating conditions. This, of course, may be of a disadvantage where the device being controlled by the valve assembly is included in a system where the sequence and timing of the operation of the various elements of the system is critical.

In addition to the above, the conventional valve assemblies, by requiring signal and actuating pressure of several pounds per square inch for controlling their operation, are not particularly suited for use in systems where only a low signal pressure is available. Such a system could be one in which fluidic devices are included and it is desired to operate the valve assembly in response to low pressure signals supplied by these fluidic devices. For example, in a typical fluidic system, it may be desirable to operate the valve assembly in response to two or three inches of water column signal pressure. In such fluidic systems, it is also usually most desirable to have any valve structure operable with a uniform response time regardless of the variations in the inlet pressure being supplied to the valve assembly.

SUMMARY OF THE INVENTION

With the construction of the valve assembly of the present invention, an improved valve actuator is provided. This valve control member is operated by the fluid pressure taken from the inlet pressure being supplied to the valve assembly; while the signal pressure used to actuate the valve may be of relatively low magnitude compared to the pressure necessary for actually effecting movement of the valve control member. In addition, with applicant's invention, the response time in which the control member is actually shifted after applying a signal pressure is constant regardless of fluctuations in the inlet pressure being supplied to the valve assembly. Also, with the actuator of the present invention, this response time is constant under different pressure settings of the valve assembly. Thus, the valve assembly may be connected to different supply pressures and the response time of the valve will remain constant.

Generally, the actuator constructed in accordance with the teachings of the present invention includes a body member connected to the valve body of the valve assembly. This body member contains a passageway in fluid communication at one end with the inlet pressure being supplied to the valve assembly. The other end of the passageway is connected in fluid communication with either one or both ends of the control member of the valve assembly so that pressure of a predetermined value supplied at this end of the passageway will cause shifting of the control member.

Disposed within the passageway is a flow restriction means for restricting the flow of fluid through the passageway. Between this restriction means and the end of the passageway which is connected to the inlet of the valve assembly there is positioned a regulator for maintaining a constant pressure immediately upstream of the restriction means. This regulator is constructed to maintain a uniform pressure of a predetermined value regardless of fluctuations in or settings of the inlet pressure above this predetermined value. With this construction, the rate of flow of fluid through the restriction means of the passageway is maintained constant. Thus, the rate of flow of fluid to the outlet end of the passageway is maintained constant. Normally, the outlet end of the passageway at its connection to the end of the spool is connected to atmosphere so that pressure is not built up at this point to a level sufficient to cause movement of the control member. This connection to atmosphere is made through a bleed port.

When the control member of the valve assembly is to be shifted, the bleed port at the outlet of the passageway of the actuator is closed. As soon as this occurs, pressure is built up at the end of the spool at a uniform rate due to the uniform rate of flow through the restriction means of the passageway. As soon as the level of this pressure reaches a value which is sufficient to move the valve spool control member, the latter member moves in one direction between its operative valving positions.

With the construction of the present invention, the mechanism for closing the bleed port to create the pressure necessary to shift the valve spool control member of the valve assembly is made responsive to a very low signal pressure by providing an actuating surface, against which the signal pressure is applied, of large area relative to the size of the bleed port.

BRIEF DESCRIPTION OF THE DRAWINGS

FIG. 1 is an exploded view of the valve assembly incorporating the actuator of the present invention;

FIG. 7 is a partial cross-sectional view of the embodiment shown in FIG. 6 in assembled condition; and FIG. 8 is a cross-sectional view of the actuator of the present invention constructed as a separate unit for attachment to fluid operated valve assemblies.

DETAILED DESCRIPTION

Figure 2:
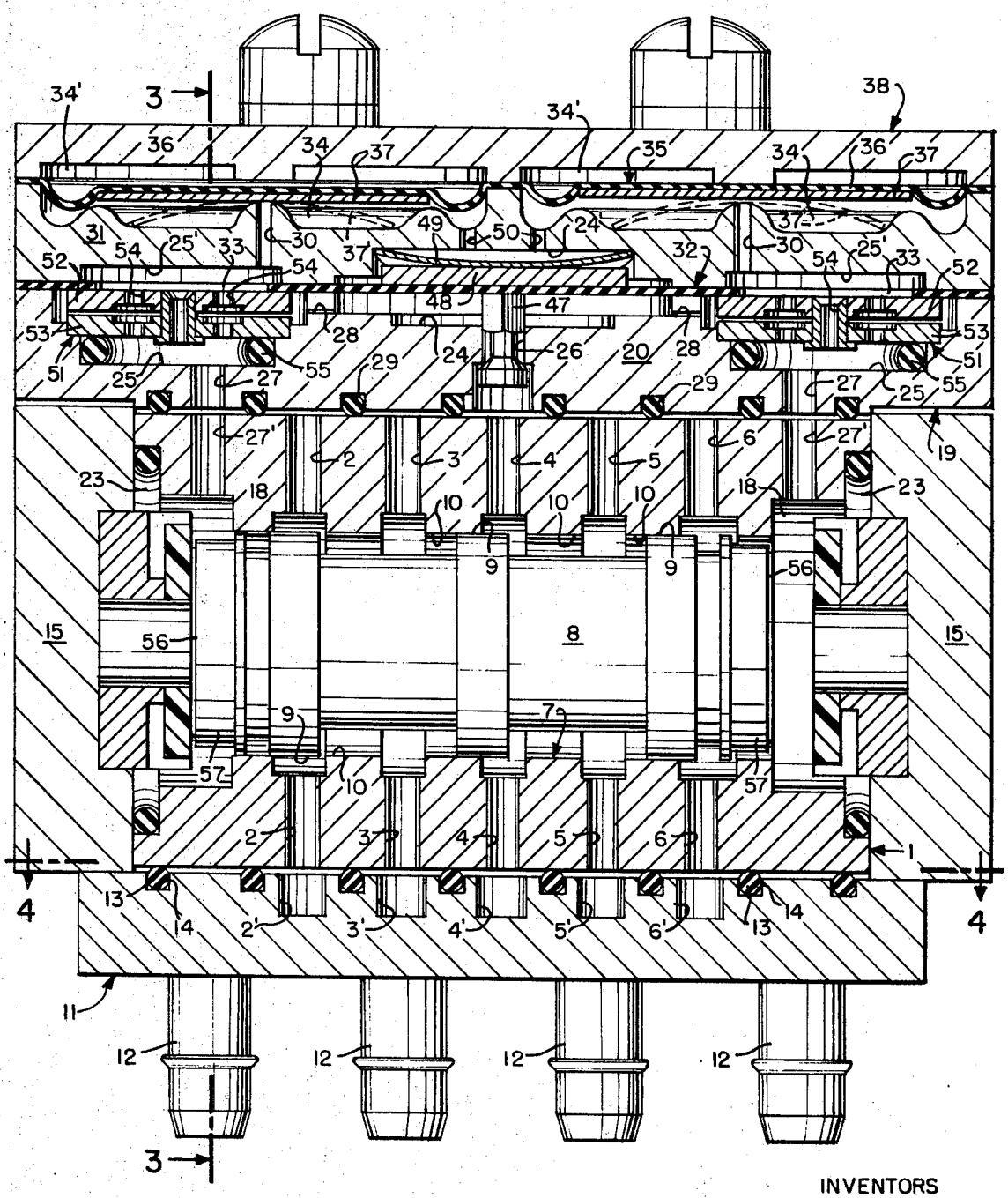
FIG. 2 is a cross-sectional view of the valve assembly with the actuator attached.
Figure 5:
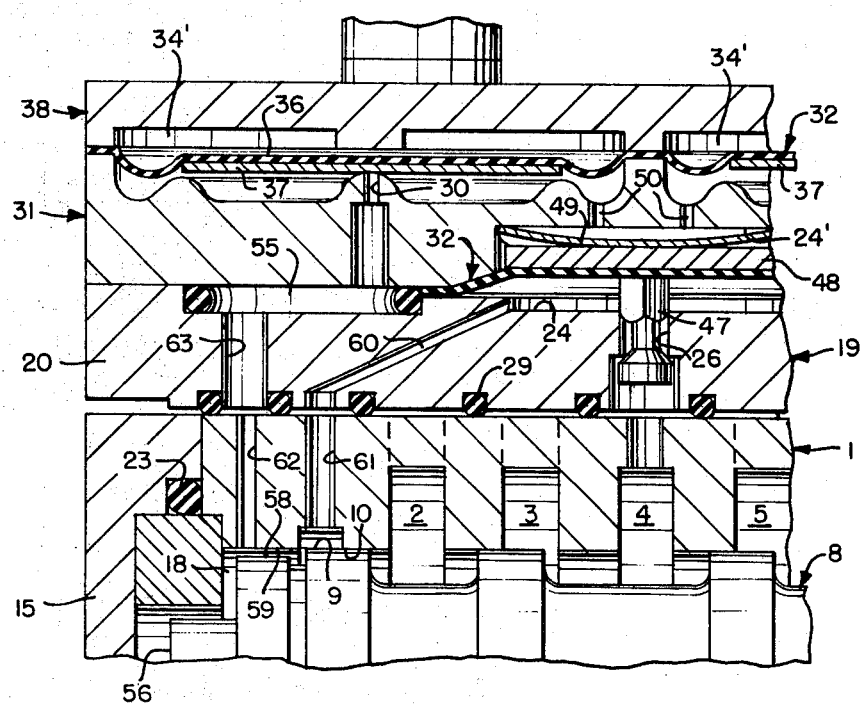
FIG. 5 is a partial cross-sectional view of a modified embodiment of the present invention.
Figure 6:
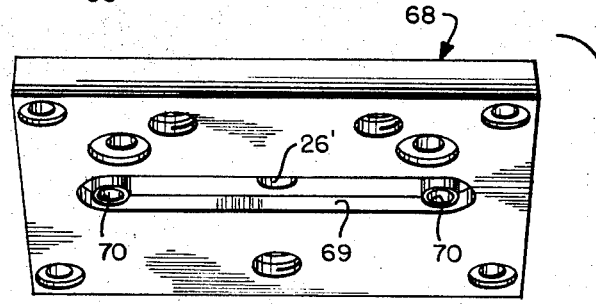
FIG. 6 is an exploded view of still another modified embodiment of the present invention.
Figure 6:
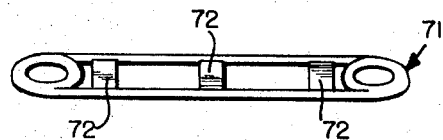
Figure 6:
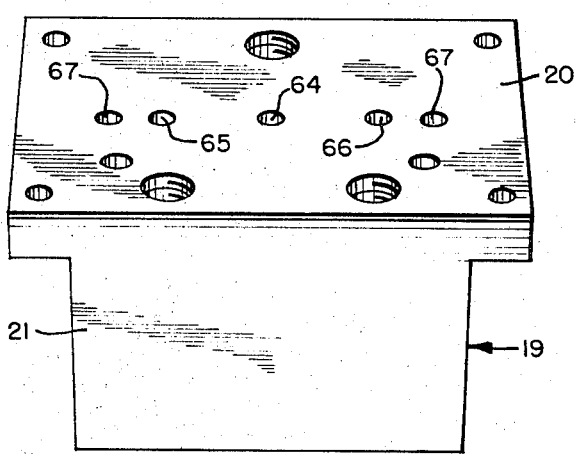

With reference to the drawings, FIGS. 1—5 show the valve actuator as incorporated into a four-way valve while FIGS. 6 and 7 show the embodiment of the actuator constructed for use with either a four-way or five-way valve assembly. With reference to FIGS. 1 and 2, the four-way valve assembly includes a valve body member 1 having a plurality of valving ports 2—6 extending therethrough from its lower surface to the upper surface. These valving ports communicate with a longitudinal bore 7 extending through the valve body member. A valve spool control member 8 is slidably mounted within the bore 7 for movement between various valving positions in which the valve ports are connected in predetermined combinations. The valve spool has a plurality of valving surfaces 9 cooperating with opposed valving surfaces 10 along the bore of the body.

The valve body of the assembly is mounted on a valve base member 11 having ports 2'—6' extending therethrough and into communication with the valving ports 2—6 of the valve body member. The bottom surface of the valve base member is provided with a plurality barbed connectors 12 for connecting the valving ports to suitable tubing. The various ports at the opposed surfaces of the valve body and valve base members are isolated from each other by a suitable molded sealing member 13 seated in a complementary shaped groove 14 in the upper surface of the valve base member. The sealing member may be made of rubber or similar material.

An end cap 15 is mounted at each end of the valve body member, and each of these end caps may include a detent assembly.

In the four-way valve assembly described above, an inlet pressure would be supplied to valving port 4 while valving ports 3 and 5 would be connected to the mechanism which is to be controlled by the valve assembly. For example, ports 3 and 5 may be connected to opposite ends of pneumatically operated cylinder. Ports 2 and 6 of the valve assembly shown in FIG. 2 would then be connected to exhaust for purposes of exhausting the different ends of the cylinder while the other end is being supplied with pressure.

For actuating the control member and causing shifting thereof between the two end caps 15, fluid pressure supplied to the inlet 4 of the assembly is directed to the opposite ends of the control member. These ends define the actuating surfaces of the control member; and as shown in FIG. 2, the valve body member 1 at each end is provided with a chamber 18 into which the associated ends of the valve spool control member 8 are adapted to move. These chambers are at all times in fluid communication with the actuating surfaces at the ends of the valve spool control member; and are each connected to the inlet port 4 of the valve assembly by means of a fluid passageway. To provide this passageway, the valve actuator of the present invention includes a body member 19 which is positioned over the valve body member 1 of the valve assembly. The body member of the actuator includes a top wall portion 20 and two sidewall portions 21 which completely enclose the valve body 1 except for the ends thereof. The end caps of the valve assembly are attached to the body member 19 of the actuator by suitable screws 22. Sealing rings 23 are provided between the ends of the valve body and end caps to seal the chambers 18.

The upper surface of the body member of the actuator includes a central recessed area 24 and two end recessed areas 25. The central recessed area 24 is connected to the inlet port 4 of the valve body by way of the passageway portion 26. The end recessed areas 25 are connected to the chambers 18 at the opposite ends of the valve body 1 by way of the passageway portion 27 in the body member 19 of the actuator and aligned passageway portions 27' in the valve body 1. The central recess area 24 is connected to each of the end recessed areas by the passageway portions 28. Together, the passageway portions 26, 28, 27 and 27' define two partially overlapping passageways connecting the inlet port of the valve body 1 of the valve assembly to each of the chambers 18 at the end of the valve body. A molded sealing member 29 is seated within the lower surface of the upper wall portion 20 of the body member of the actuator to seal the various ports against communication with each other.

Actuation of the valving assembly, including shifting of the valve spool control member within the valve body member 1 of the valve assembly, is effected by increasing the pressure in one of the chambers 18 to a valve creating the necessary force to move the valve spool control member. Normally, these chambers are connected to atmosphere via restricted bleed port means 30 which connect the end recessed areas 25 of the body member 19 of the actuator to atmosphere. Closing of either one of these bleed ports will permit pressure to built up in the associated chamber 18 and thus cause movement of the valve control member.

Figure 3:
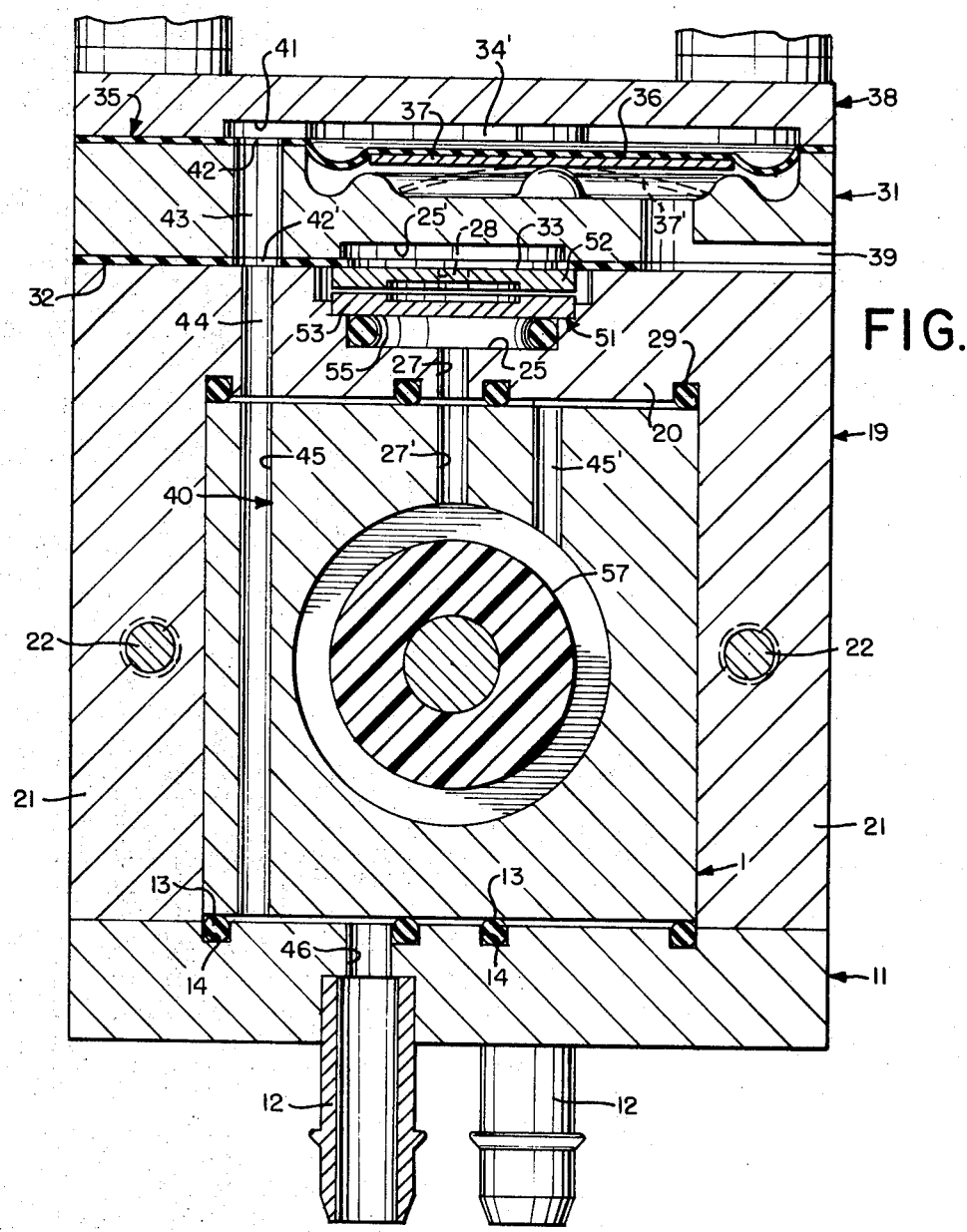
FIG. 3 is a cross-sectional view taken along lines 3—3 of FIG. 2.
Figure 4:
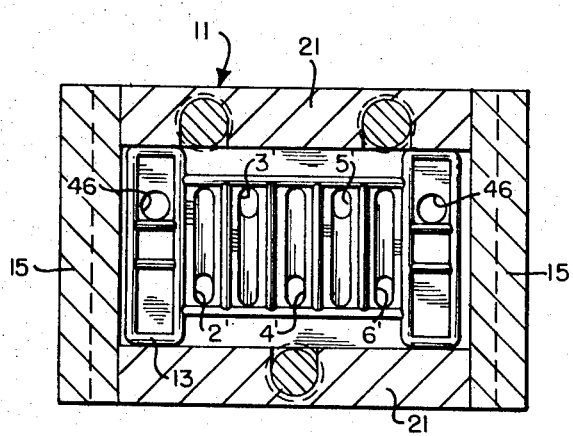
FIG. 4 is a cross-sectional view taken along lines 4—4 of FIG. 2.

As shown in FIGS. 1, 2 and 3, the bleed ports are provided in a separate plate element 31 which is adapted to be connected to the top of the body member 19 of the actuator. The lower surface of this plate element includes two recessed areas 25' which are aligned with the recessed areas in the upper surface of the body member 19. In addition, the lower surface of this plate element is provided with a centrally located recessed area 24' aligned with the recessed area 24 of the body member of the actuator. To seal the recessed areas 25 and 25' to each other between members 19 and 31, a rubber seal element 32 is provided. This sealing element includes openings 33 which are aligned with the end recessed areas.

The bleed port 30 extending from each of the recessed areas 25, 25' leads into secondary chambers 34 formed in the upper surface of the plate element 31. These secondary chambers are covered by a sealing member 35. The sealing member is of a size completely covering the upper surface of the plate element 31 and includes two diaphragm portions 36 having sealing plates 37 adhered thereto. These sealing plates overlie the bleed ports 30 and are adapted to be moved into sealing engagement therewith as shown at the left hand portion of FIG. 2. The diaphragm portions 36 of the sealing member 35 together with the sealing plates 37 define selectively operable closing means for the two bleed ports.

The sealing member 35 is held in place over the plate member 31 by the top plate member 38. Recessed areas 34' are provided on the underneath surface of this top plate member 38 in opposed relation to the secondary chambers 34 of the plate member 31. Fluid pressure is adapted to be supplied to the recessed areas 34' of the top plate member to apply a force against the upper surface of the diaphragm portions 36 facing these recessed areas. The upper surfaces of the diaphragm portions 36 are isolated from the associated bleed ports and define the actuating surfaces of the bleed port sealing means. Normally, the secondary chambers 34 under the sealing members 37 are connected to atmosphere by suitable vents 39 shown in FIG. 3. With this venting, the chambers 18 are normally maintained at or slightly above atmospheric pressure. The valve assembly with the actuator is held together by suitable screws extending from the top plate member, through aligned holes in the various ports, and into threaded holes in the base member of the valve assembly.

To close either one of the chambers 18 and to thus build up a pressure therein sufficient to move the control member of the valve, the appropriate diaphragm portion 36 of the sealing member 37 is moved downwardly into sealing engagement with the bleed port 30 as shown at the left of FIG. 2. To supply pressure to the upper recessed area 34' to effect this result, each of the recessed areas 34' are adapted to be connected via isolated conduit means 40 to a suitable source of signal pressure.

As shown in FIGS. 1 and 3, each conduit means includes a recessed portion 41 in the underneath surface of the top plate member 38 which communicates with the recessed portion 34' and with a hole 42 extending through the sealing member 35. The hole 42 is in turn aligned with a conduit portion 43 extending through the plate member 31. Conduit portion 43 communicates with a conduit portion 44 in the body member 19 of the actuator via the aligned hole 42' in the sealing member 32. The valve body member includes a conduit portion 45 extending between the upper and lower surfaces thereof and communicating at the upper surface with the conduit portion 44 of the actuator body member and at the lower surface with a conduit portion 46 in the base member of the valve assembly through which a suitable signal pressure is adapted to be supplied. It will be evident from FIG. 1 that two isolated conduit means 40 are provided; one for each of the diaphragm portions of the sealing member 35.

As seen from FIG. 2, the actuating surfaces of the diaphragm portions 36 of the bleed port sealing means which face the recessed areas 34' are larger in area relative to the restricted size of the bleed ports. Thus, a pressure of very low magnitude supplied to the actuating surface of the bleed port sealing means will hold it in sealing engagement over the bleed port 30.

To provide a constant response time for actuating the valve regardless of fluctuations in supply pressure or different settings of the pressure supplied to the valve assembly, the passageway leading to each of the chambers 18 is provided with a common regulator means and separate restriction means which together control the rate of flow to the chambers 18. As shown in FIG. 2, the regulator means includes a poppet valve 47 disposed within the common passageway portion 26. The upper end of this poppet valve extends into the central recessed area 24 of the body member of the actuator. This area 24 is isolated from the aligned recessed area 24' by the sealing member 32. Positioned within the recessed areas 24' is a disc member 48 and spring 49 opposing the poppet valve 47. The recessed area 24' is lead to atmosphere by the vents 50 connecting this area to the secondary chambers 34 on the upper surface of the plate member 31.

The construction of the regulator is such as to maintain a constant pressure within the passageway portion 28 between the regulator and recessed areas 25 and 25'. For example, the regulator may be constructed to maintain a pressure of 20 pounds per square inch. This would be done by choosing a spring of appropriate strength so that the spring will normally force the disc member 48 and sealing member 32 downwardly to keep the poppet valve 47 open in passageway portion 26 until a counter pressure of 20 pounds per square inch is created against the opposed undersurface of the sealing member 32. As soon as this counter pressure is created, the poppet valve will close and thus inlet pressure will no longer be supplied to the recessed area 24. Since this area is, via the passageway portion 28, recessed areas 25, 25', and bleed ports 30 connected to atmosphere, the pressure within the recessed area 24 will immediately drop upon closing of the poppet valve. This, in turn, will create reopening of the poppet valve 47. In operation, the poppet valve will modulate to maintain a constant pressure in the portion of the passageway disposed between the regulator means and recessed areas 25, 25'; and this constant pressure will be maintained regardless of any fluctuations in the inlet pressure supplied to the inlet port 4 of the valve assembly as long as such inlet pressure is equal to or greater than the setting of the regulator means.

Disposed within each of the recessed areas 25, 25' are separate restriction means 51 for maintaining a constant rate of fluid flow into the chambers 18. As shown, the restriction means includes a pair of disc members 52, 53 secured together in closely spaced relationship to provide a restricted peripheral orifice therebetween. The peripheral orifice of each of the pairs of discs communicates with the passageway portion 28 on opposite sides of the regulator means. The disc members also include openings 54 extending therethrough inwardly of their peripheries for connecting their peripheral orifices to the recessed areas 25 and 25'. The peripheral orifice defined by the spacing of the discs and connecting with the passageway portion 28 is isolated from the recessed area 25 and 25' by the lower sealing rings 55 and the overlying sealing member 32.

The restriction of fluid flow through the restriction means 51 is accomplished by the excess friction created in the inefficient flow through the peripheral orifice. This construction not only provides for a restricted flow of fluid; but also eliminates plugging of the restriction since the peripheral length of the orifice is extremely large in comparison to the small diameter of a hole of equivalent flow capacity.

With the regulator means and restriction means connected in series in the passageway leading from the inlet port 4 of the valve assembly to the chambers 18, the rate of flow into the chambers is constant regardless of fluctuations in inlet pressure. Thus, once the bleed port associated with either chamber is closed by applying a signal pressure to the appropriate closing means 36, 37, it will take a uniform time to raise the pressure within this chamber to a level sufficient to shift the valve spool control member. With the construction shown in FIG. 2, it is possible to effect shifting of the valve in a response time of less than a millisecond; such shifting being effected as soon as the pressure within the chamber 18 acting against the end actuating surface of the spool, indicated at 56 in FIG. 2, is great enough to overcome the detent.

In operation of the actuator of the present invention, the signal pressure applied to the actuator may be received from a fluidic device and may be either a continuous pressure or an intermittent one. Where a continuous pressure is applied as a signal, the chambers 18 may be connected to the exhaust ports of the valve assembly to quickly exhaust the chambers after the signal pressure has caused shifting of the control member. Exhausting of the chambers is necessary so that they will not counter a build up of pressure in the other chamber when the control member is to be shifted back to its initial position. For this purpose, the control member is provided with surfaces 57 of reduced diameter at the ends thereof. When the valve spool control member 8 is shifted to the position shown in FIG. 2, the surface 57 at the right hand end of the control member will provide for fluid flow between the right hand chamber 18 and adjacent exhaust port 6 of the valve assembly. Similarly, when the control member is shifted to the right, the left hand chamber will be exhausted to the exhaust port 2 of the valve assembly. This construction provides a quick exhaust for the chambers 18 after shifting of the control member.

Under certain conditions, it may be desirable to have the valve assembly constructed in such a way that it does not respond to signal pressures below a certain magnitude. This may be accomplished by providing an appropriate spring shown in dotted lines at 37' under the sealing plates 37 thus requiring a greater signal pressure to cause movement of these plates into sealing engagement with the bleed ports.

Alternatively, the signal pressure may be applied directly to the chambers 18. For this purpose, the valve body is, as shown in FIGS. 1 and 3, provided with a further conduit means 45' extending from its upper surface directly to the end chambers 18. With the valve assembly connected together as shown in FIG. 3, these conduits 45' are nonfunctional and lead into a dead space at the lower surface of the body member of the actuator. When, however, it is desired to connect the valve assembly so that the signal pressure will be supplied directly to the end chambers 18 rather than through the conduit 40 so as to disconnect pressure regulator and flow restriction means, the valve body is inverted and its uppermost surface as shown in FIG. 3 is positioned on the base member 11 of the assembly. This will place the conduits 45' in communication with the conduit portions 46 of the base member of the valve assembly from which the signal pressure is received. In this position of the valve body, it will be noted that the conduit means 40 will be nonfunctional since the conduit portions 45 of the valve body will lead to dead spaces at the upper and lower surfaces of the valve body.

FIG. 5 shows a modified embodiment of the actuator in which the flow restriction means is provided by adding extra land 58 to each end of the valve spool control member for cooperating with opposed lands 59 on the valve body member. These extra lands of the control member are manufactured so that they are slightly smaller in diameter than the diameter of the lands 59. With this construction, the disc restriction means 51 are eliminated and the recessed area 24 is connected via passageway portions 60, 61 in the body member 19 of the actuator and the valve body member 1 of the valve assembly directly to the restricted orifices defined between the lands 58 and 59. With this construction, the flow of fluid to the chambers at the ends of the valve control member is restricted as it passes between the lands 58 and 59. In the embodiment of the invention shown in FIG. 5, the chambers at the ends of the valve spool are connected to the bleed port 30, and thus to atmosphere via the passageway portions 62, 63 formed, respectively, in the body member of the valve assembly and the body member of the actuator.

FIGS. 6 and 7 show the valve actuator of the present invention constructed for use in either a four-way or a five-way valve. In a five-way valve, the ports 2 and 6 are connected to inlet pressures, usually of different values, and the port 4 is connected to exhaust. In order that the actuator may be used in either a four-way or five-way valve, it is necessary to have a connection for each of the potential inlet ports 2, 4 and 6 to the pressure regulator means and to provide means whereby only the highest inlet pressure functions as the supply pressure for the regulating means. For this purpose, the embodiment of the invention shown in FIG. 6 is well-suited.

Here, the upper surface of the top wall portion 20 of the body member 19 of the actuator is not provided with any recessed areas. Instead, it is provided with passageways connecting each of the potential inlet ports 2, 4 and 6 of the valve body to its upper surface. In particular, the passageway 64 is provided for connecting with the valve port 4 while passageways 65, 66 are provided for connecting with the valve ports 2 and 6 of the valve assembly. These passageways 64, 65 and 66 will connect each of the potential inlet ports of the valve assembly to the pressure regulator as more fully explained below. In addition, the upper wall portion of the body member 19 is provided with passageway portions 67 which will be in alignment with the passageway portion 27' of the valve body of the assembly. Also, passageway portions 44 are provided just as they were provided in the embodiment shown in FIG. 1.

Disposed above the upper surface of the body member 19 is a transfer plate 68. The lower surface of this transfer plate is provided with a chamber 69. Centrally disposed within this chamber is a passageway 26', corresponding to the passageway 26 of the body member of the embodiment shown in FIG. 1, for reception of the poppet valve 47 of the pressure regulating means. At the ends of the chamber 69 are passageway portions 70 corresponding to the passageway portions 27 of the embodiment shown in FIG. 1. The upper surface of the transfer plate 68 is identical in construction to the upper surface of the upper wall portion 20 of the body member 19 shown in FIG. 1. Thus, all the elements of the actuator above the transfer plate are identical to the elements above the body member of the embodiment of FIG. 1.

The transfer plate includes a sealing member 71 which isolates the passageway portions 70 from communication with the rest of the chamber 69. This sealing member also includes flexible membrane portions 72 extending thereacross and adapted to be aligned with the passageways 64, 65 and 66. With the transfer plate assembled over the body member of the actuator, the flexible portions 72 are disposed in sealing engagement over the passageway portions 64, 65 and 66 when no pressure is applied to the valve assembly. When an inlet pressure is applied to either one of the inlet ports 2, 4 or 6, it will tend to raise the flexible portion of the sealing means thereabove and fluid pressure entering the chamber 69 will then act against the other flexible portions to hold them closed. Thus, the inlet pressure will be supplied to the regulating means of the actuator. When the valve assembly is connected as a five-way valve and different pressures are supplied to the inlet ports 2 and 6, the inlet port receiving the higher pressure will raise the associated flexible portion of the sealing means and the pressure created within the chamber 69 will prevent unsealing of the flexible portion overlying the inlet port receiving the lower inlet pressure.

FIG. 8 shows the actuator of the present invention constructed as a separate unit for attachment to a pilot operated valve. As shown, the actuator includes a body member 71 having a high pressure inlet passageway portion 72 adapted to be connected to the inlet port of the valve assembly and an outlet passageway portion 73 adapted to be connected to one or both of the end chambers of the valve assembly or to appropriate actuating mechanism for engaging the ends of the control member of the valve assembly. A pressure regulator means 74 and restriction means 75 are provided in the passageway between the portions 72 and 73. A control signal is supplied to the actuator through the passageway 76 to move the closing means 77 into sealing engagement with the bleed port 78. The bleed port is vented to atmosphere by the vent 79. When the regulator of the actuator is not to be used, the signal pressure may be supplied through the inlet passageway 80.

From the above, it will be evident that the actuator of the present invention may be constructed as a separate unit or an integral part of a valve assembly. It is also to be understood that the actuator may be used to effect movement of the control member of the valve in either one or both directions between its operative valving positions.

We claim:

1. An actuator for a valve assembly having inlet and outlet port means and a control member movably mounted within said assembly for movement between a plurality of operative valving positions to selectively connect said port means in predetermined combinations, said control member having an actuating surface against which a predetermined force will cause said control member to move in one direction between said positions, said actuator comprising:
  a. a body member having an inlet port and an outlet port with said inlet port being operatively connected to the inlet port means of said valve assembly and said outlet port being operatively connected to the actuating surface of said control member;
  b. a passageway extending through said body member between the inlet and outlet ports thereof;
  c. flow restriction means within said passageway;
  d. bleed port means connected to said passageway between said restriction means and outlet port to permit escape of fluid pressure therefrom;
  e. regulator means positioned within said passageway between said inlet port and said restriction means for maintaining a fluid pressure of constant predetermined value within said passageway between said regulator means and restriction means and a constant rate of flow of fluid through said restriction means regardless of changes in the fluid pressure at the inlet port over said predetermined value; and
  f. selectively operable means for restricting flow through said bleed port means to create a fluid pressure at said outlet port of sufficient valve to exert said predetermined force on said actuating surface of said control member to move it in one direction between said positions.

2. In a valve assembly having inlet and outlet port means and a control member movably mounted within said assembly between a plurality of operative valving positions to selectively connect said port means in predetermined combinations, an improved actuator for moving said control member in at least one direction between said positions comprising:
  a. a chamber into which a surface of said control member extends, said surface being one against which a predetermined force will cause said control member to move in one direction between said positions;

b. a passageway connecting said inlet port means to said chamber;

c. flow restriction means within said passageway;

d. bleed port means connected to said chamber to permit escape of fluid pressure therefrom;

e. regulator means positioned within said passageway between said inlet port means and restriction means for maintaining a fluid pressure of constant predetermined value within said passageway between said regulator means and restriction means and a constant rate of flow of fluid through said restriction means regardless of changes in the fluid pressure at the inlet port means over said predetermined value; and f. selectively operable closing means for closing said bleed port means to create a fluid pressure within said chamber of sufficient value to exert said predetermined force on said surface of the control member to move it in one direction between said positions.

3. In a valve assembly according to claim 2, the improvement wherein said selectively operable closing means includes:

a. a fluid actuated member positioned opposite said bleed port means for movement into sealing engagement therewith, said member having an actuating surface of large area relative to the size of said bleed port means, and b. conduit means leading to said actuating surface and adapted to be connected to a source of fluid signal pressure.

4. In a valve assembly according to claim 2, the improvement wherein said actuator further comprises:

a. a second chamber into which a second surface of said control member extends, said second surface being one against which said predetermined force will cause said control member to move in a direction opposite to said one direction between said positions;

b. a passageway portion connecting the downstream side of said regulator means to said second chamber; and c. a second flow restriction means, bleed port means and selectively operable closing means associated with said second chamber in the same manner as the first mentioned ones of these means are associated with the first mentioned chamber.

5. In a valve assembly having a valve body with a longitudinal bore therein and inlet and outlet valve port means communicating with said bore, a valve spool control member slidably received in said bore and movable between a plurality of operative valving positions to selectively connect said port means in predetermined combinations, and cooperating valving surfaces on said valve body and control member for sealing off certain ports from certain other ports in various operative positions of said control member, an improved actuator for moving said control member in at least one direction between said positions comprising:

a. a chamber disposed at least one end of said control member in fluid communication with the end surface thereof against which a predetermined force will cause said control member to move in said one direction;

b. a passageway connecting the inlet port means of said valve body to said chamber;

c. flow restriction means within said passageway;

d. bleed port means connected to said chamber to permit escape of fluid pressure therefrom;

e. regulator means positioned within said passageway between said inlet port means and restriction means for maintaining a fluid pressure of predetermined value within said passageway between said regulator means and said restriction means and a constant rate of flow of fluid through said restriction means regardless of changes in the fluid pressure at the inlet port means over said predetermined value; and f. selectively operable closing means for closing said bleed port means to create a fluid pressure within said chamber of sufficient value to exert said predetermined force on the end surface of said control member to move it in said one direction between said positions.

6. In a valve assembly according to claim 5 wherein said valve body is supported on a valve base, the improvement wherein said selectively operable means includes:

a. a fluid actuated member positioned opposite said bleed port means for movement into sealing engagement therewith, said member having an actuating surface isolated from and facing away from said bleed port means; and b. conduit means leading to said actuating surface and adapted to be connected to a source of fluid signal pressure, said conduit means including a first conduit portion extending through said valve base and a second conduit portion extending through said valve body from a first surface thereof to a second oppositely disposed surface and in communication with said first conduit portion when said valve body is disposed in one position with said first surface on said valve base.

7. In a valve assembly according to claim 6, the improvement wherein:

a. said valve body includes further conduit means isolated from said second conduit portion and extending therethrough from said second surface to the end of the bore communicating with said chamber, said second conduit portion and said further conduit means being positioned so that said further conduit means is nonfunctional when said valve body is in said one position and so that said second conduit portion is nonfunctional and said further conduit means is in communication with the first conduit portion of the valve base to connect said first conduit portion directly to said chamber when said valve body is in a second position with said second surface on said valve base.

8. In a valve assembly according to claim 5 wherein:

a. said bleed port means is of restricted size; and b. said selectively operable closing means for closing said bleed port means includes:

1. a secondary chamber into which said bleed port means leads from said first mentioned chamber;

2. a vent connecting said secondary chamber to atmosphere;

3. flexible diaphragm disposed within said secondary chamber for closing said bleed port means; said diaphragm having an enlarged actuating surface relative to the size of said bleed port means; and 4. conduit means leading to said actuating surface and adapted to be connected to a source of fluid signal pressure.

9. In a valve assembly according to claim 5, the improvement wherein said restriction means includes:

a. a pair of disc members secured together in closely spaced relation to provide a restricted peripheral orifice therebetween communicating with the portion of said passageway located between said regulator means and said restriction means, one of said discs having an opening extending therethrough inwardly of its periphery and communicating with the portion of said passageway located between said restriction means and said chamber.

10. In a valve assembly according to claim 9, the improvement wherein:

a. the other of the discs has an opening extending therethrough inwardly of its periphery and communicating with said bleed port means.

11. In a valve assembly according to claim 5, the improvement wherein said restriction means includes:

a. a radial land at said one end of the control member; and b. an opposing land on said valve body spaced from the land on the control member to define a restricted orifice therebetween, said restricted orifice communicating with said chamber.

12. In a valve assembly according to claim 5 wherein the outlet ports of the valve body are located adjacent the ends of said bore, the improvement wherein said control member includes:
a. a valving surface at said one end thereof for sealing said bore from said chamber when the one end of said control member is located within said chamber in a position ready for moving in said one direction;
b. a surface of reduced outer dimension disposed axially outwardly of said valving surface for providing communication between said chamber and the adjacent end of said bore after said control member has moved in said one direction to permit escape of fluid pressure from said chamber through the exhaust port means of said valve body.

13. In a valve assembly according to claim 5 wherein said valve body has a plurality of selectively operable inlet port means, said improvement further including:
a. a chamber in said passageway to which each of said inlet port means is adapted to be selectively connected, said chamber communicating with said regulator means;
b. sealing means disposed within said chamber, said sealing means having separate independently flexible portions overlying each of said inlet port means for movement into sealing engagement therewith upon a pressure being exerted against the surface thereof facing away from said inlet port means.